United States Patent [19]
Katoh et al.

[11] Patent Number: 5,188,912
[45] Date of Patent: Feb. 23, 1993

[54] BUTTON BATTERY HOLDER

[75] Inventors: Tokoyuki Katoh; Nobuhito Ebine, both of Kanagawa, Japan

[73] Assignee: Sony Corporation, Tokyo, Japan

[21] Appl. No.: 686,356

[22] Filed: Apr. 17, 1991

[30] Foreign Application Priority Data

Apr. 18, 1990 [JP] Japan .................................. 2-102670

[51] Int. Cl.$^5$ .................................................. H01M 2/10
[52] U.S. Cl. ........................................ 429/96; 429/100
[58] Field of Search ................................ 429/96–100, 429/1, 9, 123; 368/88, 203, 204; 365/229, 226; 364/708

[56] References Cited

U.S. PATENT DOCUMENTS

| | | | |
|---|---|---|---|
| 4,223,076 | 9/1980 | Terada | 429/96 |
| 4,487,820 | 12/1984 | Engelstein et al. | 429/100 |
| 4,692,846 | 9/1987 | Johnson | 429/97 X |
| 4,828,944 | 5/1989 | Yabe et al. | 429/97 |
| 4,842,966 | 6/1989 | Omori et al. | 429/100 X |
| 4,992,987 | 2/1991 | Echols et al. | 429/96 X |

Primary Examiner—Anthony Skapars
Attorney, Agent, or Firm—Hill, Steadman & Simpson

[57] ABSTRACT

A button battery holder adapted to be inserted into an electronic equipment is disclosed. As the holder is mounted into the electronic equipment in the direction parallel to the electrode surfaces of the button battery, a battery holder insert hole and a battery holder mounting portion to be formed in the electronic equipment can be made small, thereby contributing to a reduction in size of the electronic equipment. Furthermore, if the orientation of the electrode surfaces is incorrect upon insertion of the button battery into the holder, the side peripheral portion of the button battery is caught by the opposite side portions of the button battery insert opening at the time of little insertion, and further insertion of the button battery is inhibited because the sectional shape of the button battery does not become coincident with the shape of the button battery insert hole under the incorrectly oriented condition of the button battery. Thus, it is possible to prevent the button battery from being incorrectly inserted into the holder under the condition that the positive and negative electrode surfaces of the button battery are incorrectly oriented.

3 Claims, 9 Drawing Sheets

BUTTON BATTERY HOLDER

BACKGROUND OF THE INVENTION

The present invention relates to a button battery holder adapted to be mounted into an electronic equipment, for example, for holding a button battery, and more particularly to an improvement in such a holder which can prevent incorrect orientation of electrode surfaces of the button battery upon insertion of the button battery into the holder.

Conventionally, various types of button battery holders are known. One example of the known holders is constructed in such a manner that the holder accommodating a button battery is mounted to an electronic equipment in a direction perpendicular to electrode surfaces of the button battery. In this type of holder, an opening formed in the electronic equipment for mounting the holder becomes large to deteriorate an external appearance of the electronic equipment and cause an enlargement in size of the electronic equipment.

To cope with this defect, there has been proposed another type of holder constructed in such a manner that the holder accommodating the button battery is inserted and mounted into the electronic equipment in a direction parallel to the electrode surfaces of the button battery. In this improved type of holder, a holder insert hole and a holder mounting portion formed in the electronic equipment can be made small.

FIGS. 7 and 8A to 8C show an example of such a conventional button battery holder as designated by reference character a.

Figure 7:
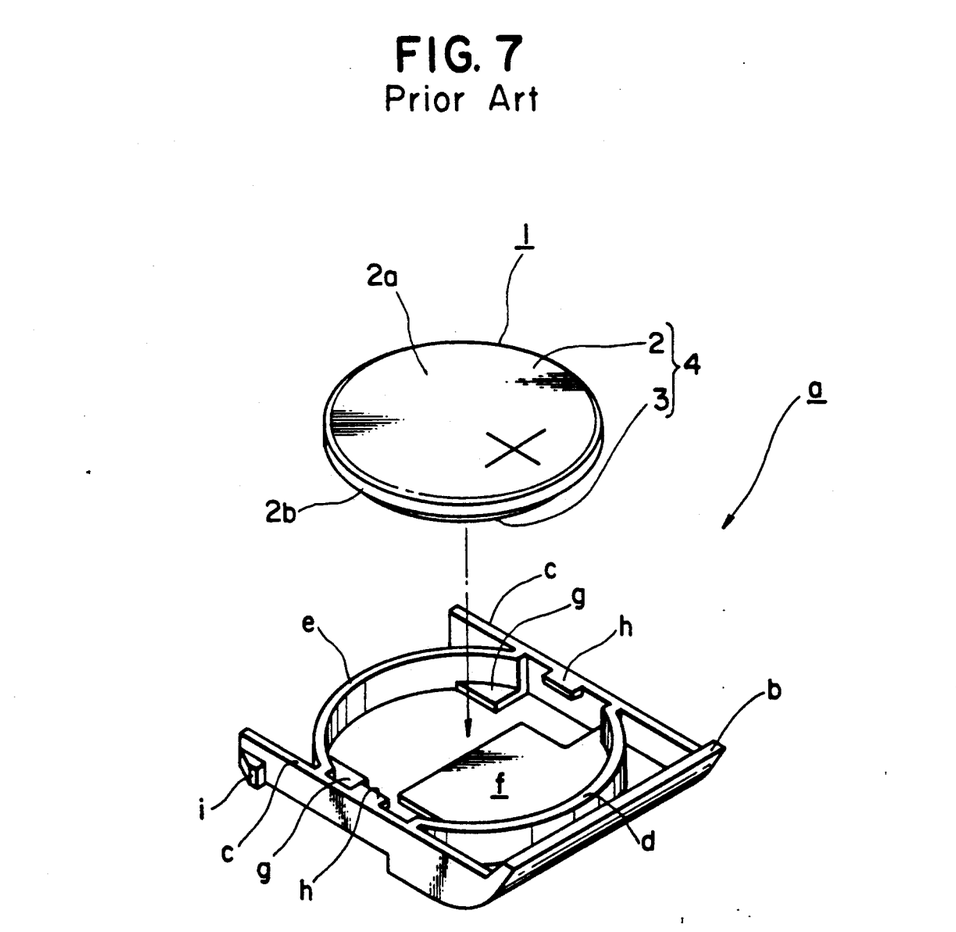
FIG. 7 is a perspective view of the holder in the prior art.

Referring to FIG. 7, the holder a formed of synthetic resin having a flexibility includes a base portion b integrally formed with a bottom plate portion $b_1$ and a rear end portion $b_2$. A pair of right and left parallel arm portions c and c' extend frontwardly from right and left edges of the rear end portion $b_2$ of the base portion b.

An arcuate wall d projects upwardly from the bottom plate portion $b_1$ of the base portion b, and right and left edges of the arcuate wall d are connected with inner surfaces of the arm portions c and c', respectively.

An arcuate wall e having an elasticity is disposed in opposed relationship to the arcuate wall d, and right and left edges of the arcuate wall e are connected with the inner surfaces of the arm portions c and c', respectively. Accordingly, a pair of right and left intermediate portions $c_1$ and $c'_1$ are formed between both the right edges of the arcuate walls d and e and between both the left edges of the arcuate walls d and e, respectively. Further, a substantially circular accommodating space f for accommodating a button battery 1 is defined by the two arcuate walls d and e and the intermediate portions $c_1$ and $c'_1$ of the arm portions c and c'. An inner diameter of the accommodating space f is set to be substantially equal to an outer diameter of the button battery 1. A pair of right and left receiving plates g and g' are formed near the right and left edges of the arcuate wall e so as to project inwardly of the space f from an inner surface of the arcuate wall e at the same level as that of the bottom plate portion $b_1$ of the base portion b. Further, a pair of right and left holding portions h and h' project inwardly of the space f from the inner surfaces of the intermediate portions $c_1$ and $c'_1$ of the arm portions c and c' at the upper edges thereof, respectively.

Further, a pair of right and left pawls i and i' (see FIGS. 8A to 8C) are formed to project from outer surfaces of the arm portions c and c' at front end portions thereof. When the holder a is fully inserted into an electronic equipment (not shown), the pawls i and i' are brought into engagement with a pair of engaging portions (not shown) provided in the electronic equipment, thus providing click lock of the holder a in the electronic equipment.

The button battery 1 such as a lithium battery is constructed of an outer shell 4 formed by a positive electrode shell 2 and a negative electrode shell 3 electrically insulated from the positive electrode shell 2. A required substance is contained in the outer shell 4.

The positive electrode shell 2 includes a circular flat positive electrode surface 2a and a side wall portion 2b continuing downwardly from an outer circumferential edge of the positive electrode surface 2a and curved inwardly toward an outer circumference of the negative electrode shell 3. The negative electrode shell 3 projects downwardly at a position slightly spaced from an inner circumferential edge of the side wall portion 2b, and includes a circular flat negative electrode surface 3a. Thus, as viewed in side elevation, that is, in a direction parallel to the electrode surfaces 2a and 3a, the button battery 1 is configured in such a manner that the small-diameter negative electrode shell 3 projects slightly from a lower surface of the large-diameter positive electrode shell 2, and that the side wall portion 2b is curved at its lower portion toward the outer circumference of the negative electrode shell 3.

The button battery 1 is mounted into the holder a in the following manner.

Figure 8A:
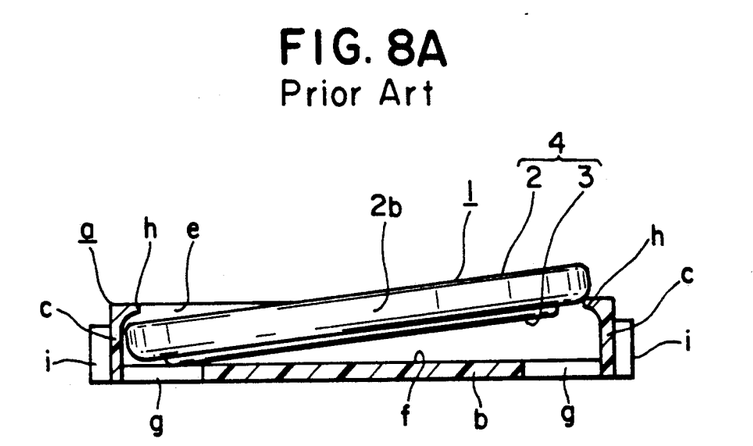
FIGS. 8A to 8C are sectional views of the holder shown in FIG. 7, showing the mounting operation of the button battery into the holder.
Figure 8B:
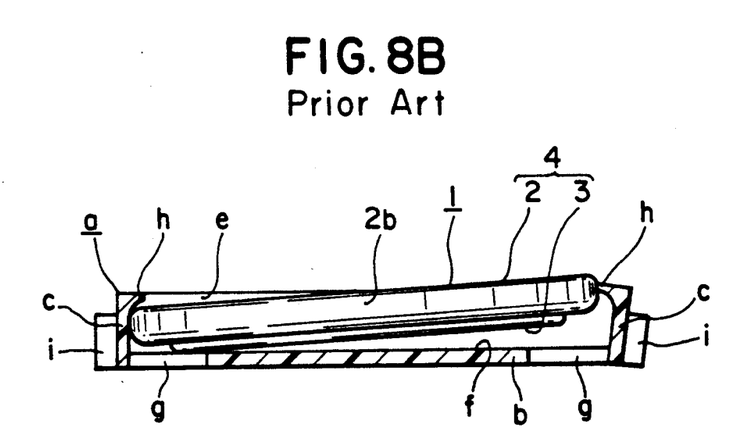
Figure 8C:
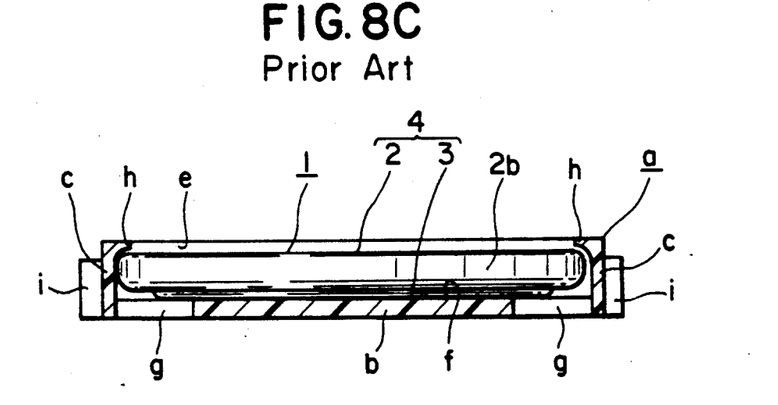

As shown in FIG. 8A, the positive electrode surface 2a of the button battery 1 is oriented upwardly, and a first part of the outer circumferential portion of the button battery 1 is inserted under the slightly inclined condition between the left holding portion h' and the bottom plate portion $b_1$ of the base portion b of the holder a. Then, a second part of the outer circumferential portion of the button battery 1 laid on the right holding portion h is depressed. As a result, the arm portion c and the arcuate wall e are elastically flexed outwardly as shown in FIG. 8B, and the second part of the outer circumferential portion of the button battery 1 is forced into the lower side of the right holding portion h. Then, the arm portion c and the arcuate wall e restore an original condition owing to their elasticity. In this manner, the button battery 1 is held in the accommodating space f of the holder a by the holding portions h and h', the bottom plate portion $b_1$ of the base portion b, and the receiving plates g and g' as shown in FIG. 8C.

Thereafter, when the holder a holding the button battery 1 is inserted and mounted into the electronic equipment, a positive terminal (not shown) provided in the electronic equipment is brought into electric contact with the positive electrode surface 2a of the button battery 1, and a negative terminal (not shown) provided in the electronic equipment is also brought into electric contact with the negative electrode surface 3a of the button battery 1 through a lower opening defined between the bottom plate portion $b_1$ and the arcuate wall e.

Figure 9:
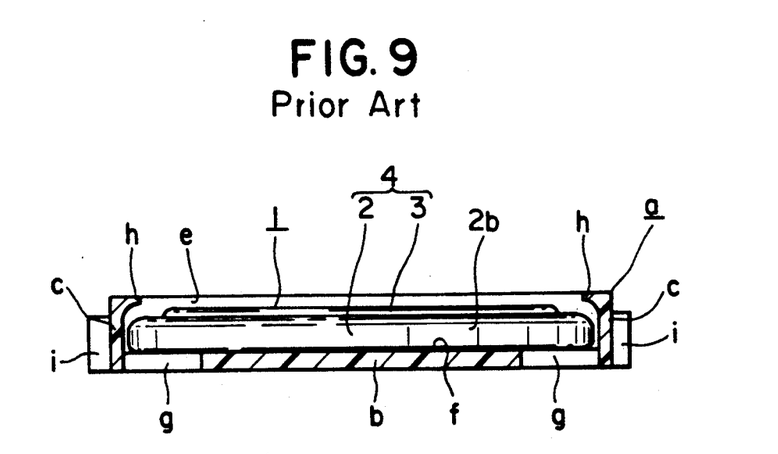
FIG. 9 is a view similar to FIG. 8C, showing the condition where the orientation of the electrode surfaces of the button battery is incorrect.

In the above-mentioned holder a, however, even when the electrode surfaces 2a and 3a of the button battery 1 are incorrectly oriented, the button battery 1 can be inadvertently mounted into the accommodating space f of the holder a as shown in FIG. 9.

This is, correct orientation of the electrode surfaces 2a and 3a must be such that the positive electrode surface 2a is oriented upwardly, and the negative electrode surface 3a is oriented downwardly. However, even when this correct orientation is inverted, that is, even when the positive electrode surface 2a is oriented downwardly, and the negative electrode surface 3a is oriented upwardly, the button battery 1 is allowed to be mounted into the accommodating space f of the holder a by inserting one of the opposite parts of the outer circumferential portion of the button battery 1 and depressing the other part of the outer circumferential portion against the elastic force of the arm portion c and the arcuate wall e.

Accordingly, there is a possibility that a user takes no notice of such incorrect orientation of the electrode surfaces 2a and 3a of the button battery 1 upon mounting of the button battery 1 into the holder a, and that the user inadvertently inserts the holder a into the electronic equipment. As a result, the electronic equipment does not operate or malfunctions.

SUMMARY OF THE INVENTION

It is accordingly an object of the present invention to provide a button battery holder which can prevent the button battery from being incorrectly inserted into the holder under the condition that the positive and negative electrode surfaces of the button battery are incorrectly oriented.

According to the present invention, there is provided a holder for holding a button battery, said holder being adapted to be mounted into an electronic equipment in a direction parallel to opposite electrode surfaces of said button battery, said holder comprising a top plate having an opening; a bottom plate; a pair of said walls connecting said top plate with said bottom plate at their opposite side portions; a closed rear end wall connecting said top plate and said bottom plate with said side walls at their rear end portions; an open front end portion forming a button battery insert opening for introducing said button battery in the direction parallel to the electrode surfaces of said button battery; and a button battery accommodating portion surrounded by said top plate, said bottom plate and said side walls so as to be continued from said open front end portion, for accommodating said button battery inserted from said button battery insert opening; said button battery insert opening having a shape corresponding to a sectional shape of said button battery.

With this construction, as the holder is mounted into the electronic equipment in the direction parallel to the electrode surfaces of the button battery, a battery holder insert hole and a battery holder mounting portion to be formed in the electronic equipment can be made small, thereby contributing to a reduction in size of the electronic equipment. Furthermore, if the orientation of the electrode surfaces is incorrect upon insertion of the button battery into the holder, the side peripheral portion of the button battery is caught by the opposite side portions of the button battery insert opening at the time of little insertion, and further insertion of the button battery is inhibited because the sectional shape of the button battery does not become coincident with the shape of the button battery insert hole under the incorrectly oriented condition of the button battery. Thus, it is possible to prevent the button battery from being incorrectly inserted into the holder under the condition that the positive and negative electrode surfaces of the button battery are incorrectly oriented.

Other objects and features of the invention will be more fully understood from the following detailed description and appended claims when taken with the accompanying drawings.

DETAILED DESCRIPTION OF THE PREFERRED EMBODIMENT

There will now be described a preferred embodiment of the present invention with reference to the drawings.

Construction of Button Battery Holder

Referring to FIGS. 1 to 5, 6A and 6B, reference numeral 5 designates a button battery holder according to the present invention. The holder 5 is integrally formed of synthetic resin having a flexibility.

Figure 1:
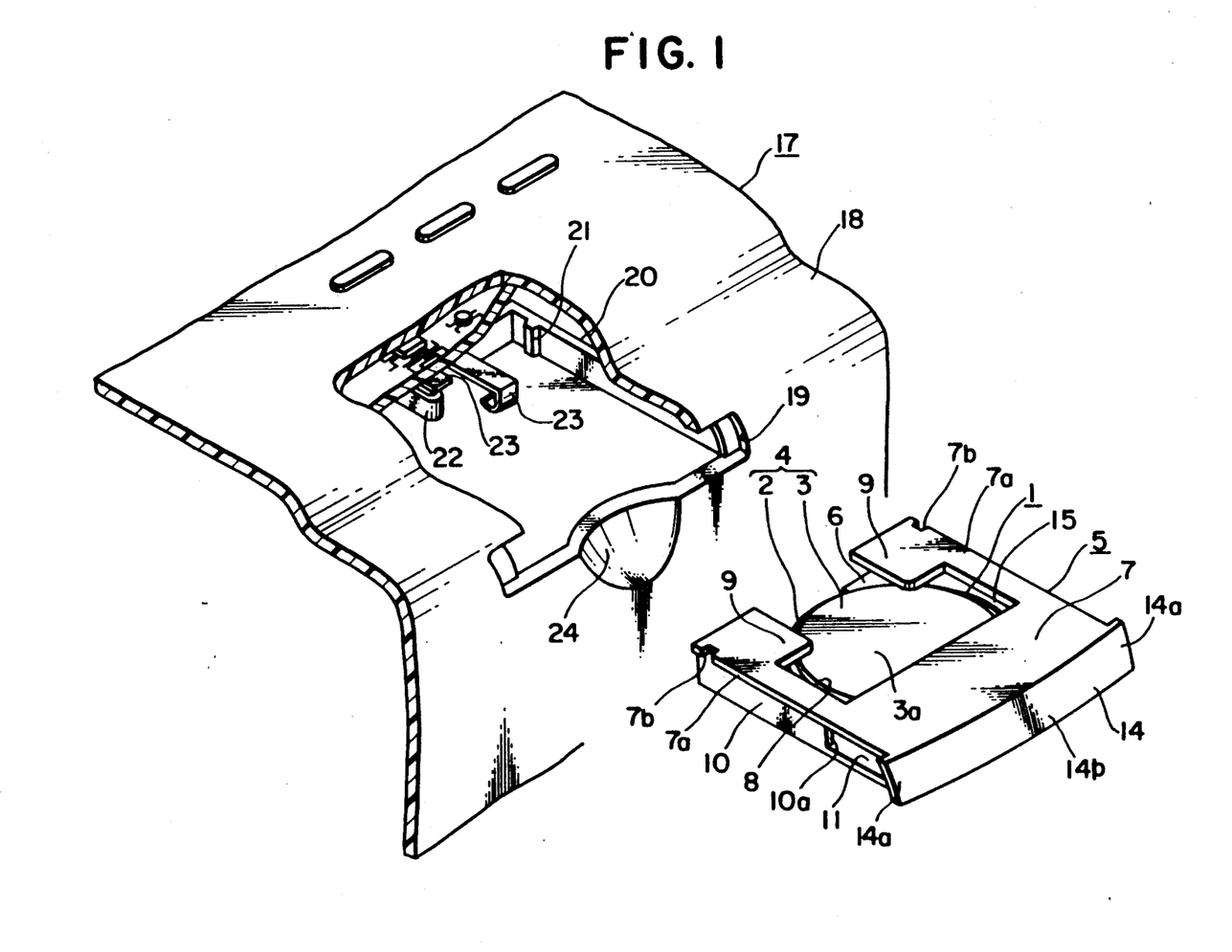
FIG. 1 is a perspective view of the button battery holder according to a preferred embodiment of the present invention under the condition where a button battery is held in the holder, and the holder is removed from an electronic equipment which is shown in partially cut-away perspective.
Figure 2:
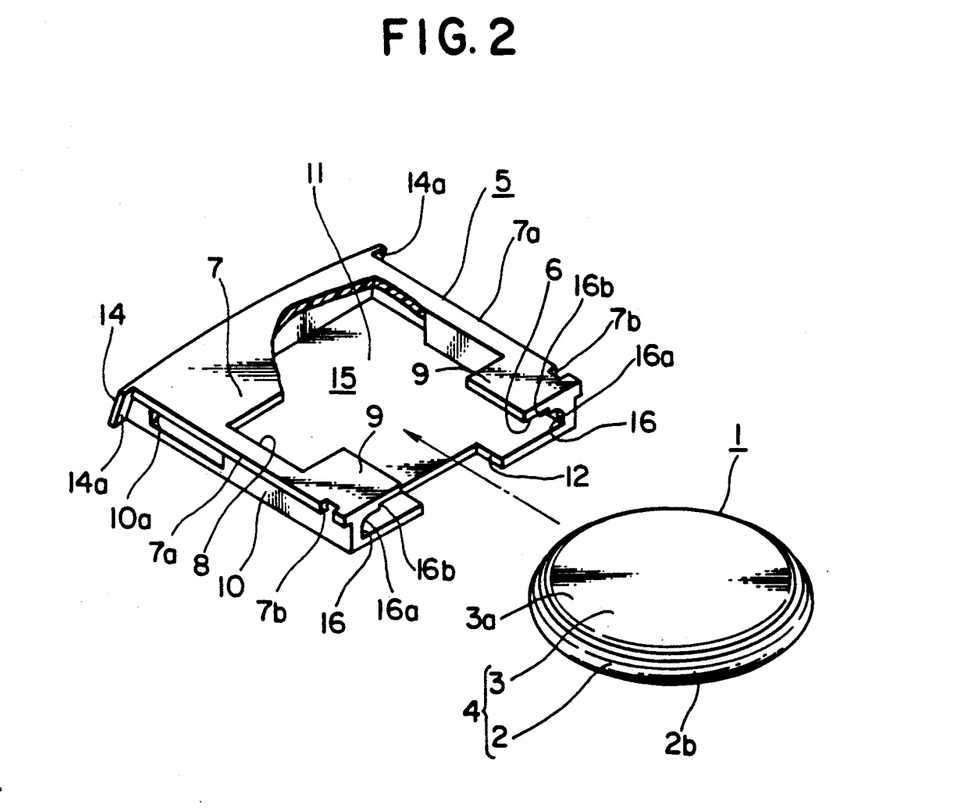
FIG. 2 is a partially cut-away perspective view of the holder under the condition where the button battery is removed from the holder.

The holder 5 has a substantially flattened box-like shape in general, and it is formed at its front end with a button battery insert opening 6 for inserting a button battery 1 therethrough. In the following description, one end of the holder 5 on the button battery insert opening 6 side will be referred to as a front end of the holder 5, and the other end on the opposite side of the button battery insert opening 6 will be referred to as a rear end of the holder 5.

A top plate 7 of the holder 5 is formed with an opening 8 consisting of a large-width opening portion 8a and a small-width opening portion 8b continuing from the large-width opening portion 8a to an upper portion of the button battery insert opening 6. A front portion of the top plate 7 on the right and left sides of the small-width opening portion 8b is formed as a pair of right and left holding portions 9 and 9' for holding the button battery 1. The opening 8 is formed in the range of about ⅔ of the length of the top plate 7.

A pair of right and left edges 7a and 7a' of the top plate 7 project slightly sidewardly from a pair of right and left side walls 10 and 10' of the holder 5, respectively. The right and left edges 7a and 7a' are formed with a pair of right and left recesses 7b and 7b', respectively, in the vicinity of the front end of the holder 5.

The right and left side walls 10 and 10' are formed with a pair of right and left openings 10a and 10a', respectively, in the vicinity of the rear end of the holder 5. The opening 10a and 10a' are necessarily formed for carrying out die forming of the holder 5.

Figure 4:
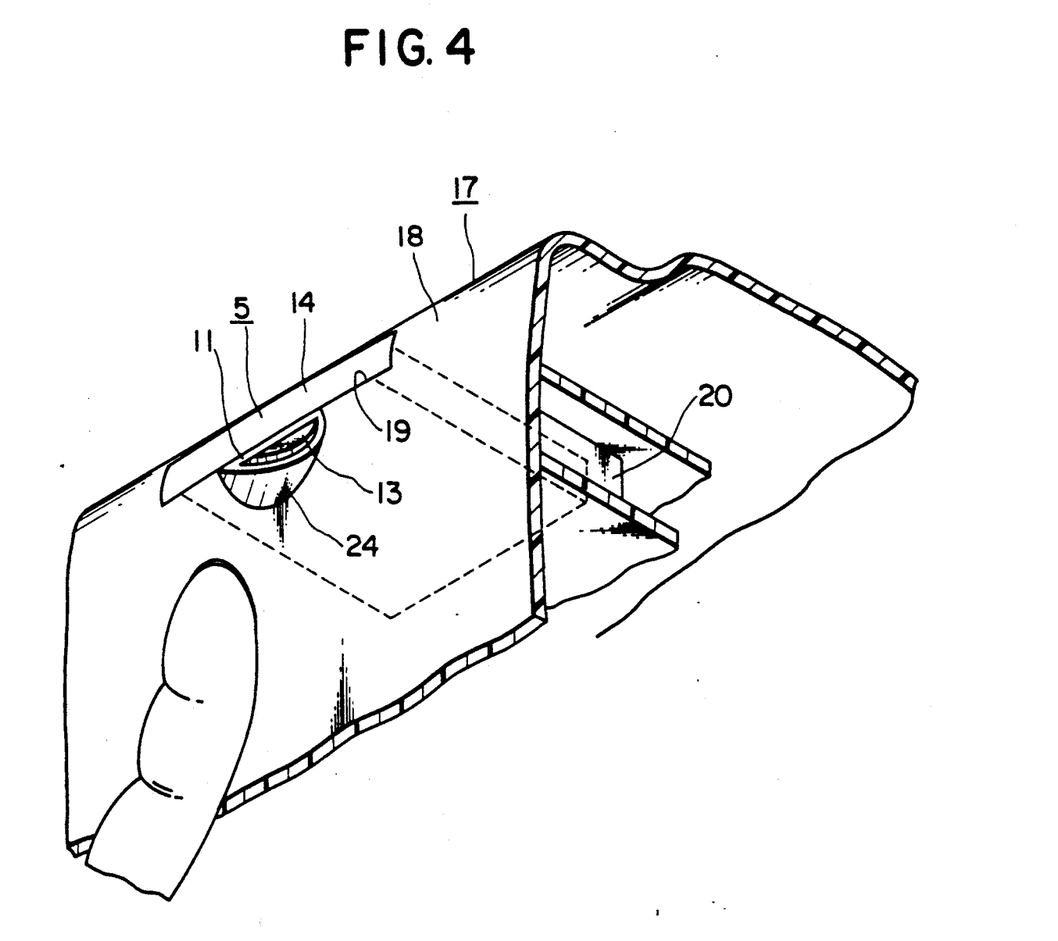
FIG. 4 is a perspective view showing the condition of FIG. 3 as viewed at a different angle.

As shown in FIG. 2, a bottom plate 11 of the holder 5 is formed at its front end with a central recess 12. Further, as shown in FIG. 4, the bottom plate 11 is formed at its rear end on a bottom surface thereof with a segmental central recess 13 adapted to be caught by a finger nail.

The holder 5 is formed at its rear end with a closing plate 14 having a pair of right and left edges 14a and 14a' projecting slightly sidewardly from the side walls 10 and 10', and having an outer surface 14b so configured as to correspond to an outer surface of an electronic equipment 17 at a mounting portion thereof into which the holder 5 is to be mounted.

Figure 5:
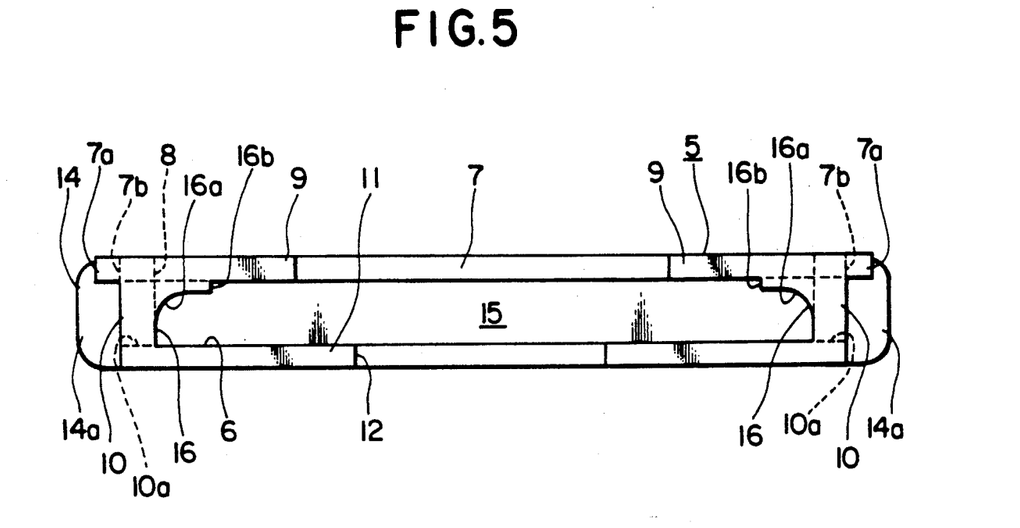
FIG. 5 is an enlarged elevational view of a button battery insert opening of the holder.

A button battery accommodating portion 15 for accommodating the button battery 1 inserted from the insert opening 6 is so formed as to be surrounded by the top plate 7, the bottom plate 11, the right and left side walls 10 and 10', and the closing plate 14. Right and left side portions of the button battery insert opening 6, that is, substantially U-shaped portions 16 and 16' surrounded by the upper holding portions 9 and 9', the side walls 10 and 10', and the right and left side portions of the bottom plate 11 are so configured as to correspond to a sectional shape of a side peripheral portion of the button battery 1. More specifically, the portions 16 and 16' include portions formed by inner surfaces of the side walls 10 and 10' and inner surfaces of the holding portions 9 and 9', which portions are comprised of a pair of right and left curved portions 16a and 16a' having a shape corresponding to a sectional shape of a side wall portion 2b of a positive electrode shell 2 of the button battery 1, and a pair of right and left stepped portions 16b and 16b' having a shape corresponding to a sectional shape of a projecting portion 3b of a negative electrode shell 3 of the button battery 1 which projecting portion 3b slightly projects upwardly from the side wall portion 2b of the positive electrode shell 2. Needless to say, a width of the button battery accommodating portion 15 of the holder 5 is set to be substantially equal to an outer diameter of the button battery 1, and a spacing between the top plate 7 and the bottom plate 11 is set to be substantially equal to a thickness of the button battery 1.

Insertion of the Button Battery into the Holder

In inserting the button battery 1 from the insert opening 6 into the accommodating portion 15 of the holder 5, the button battery 1 is moved in a direction parallel to positive and negative electrode surfaces 2a and 3a of the button battery 1 (which direction will be hereinafter referred to as a planar direction of the button battery 1). At this time, as shown in FIG. 2, the negative electrode surface 3a must be oriented to the upside, that is, in parallel relationship to the top plate 7 of the holder 5, and the positive electrode surface 2a must be oriented to the downside, that is, in parallel relationship to the bottom plate 11 of the holder 5. Under such a correctly oriented condition of the button battery 1, an outer diameter portion of the button battery 1 can be smoothly inserted through the insert opening 6 into the accommodating portion 15 since the side peripheral portion of the outer diameter portion of the button battery 1 becomes coincident in shape with the opposite side portions 16 and 16' of the button battery insert opening 6.

Figure 6A:
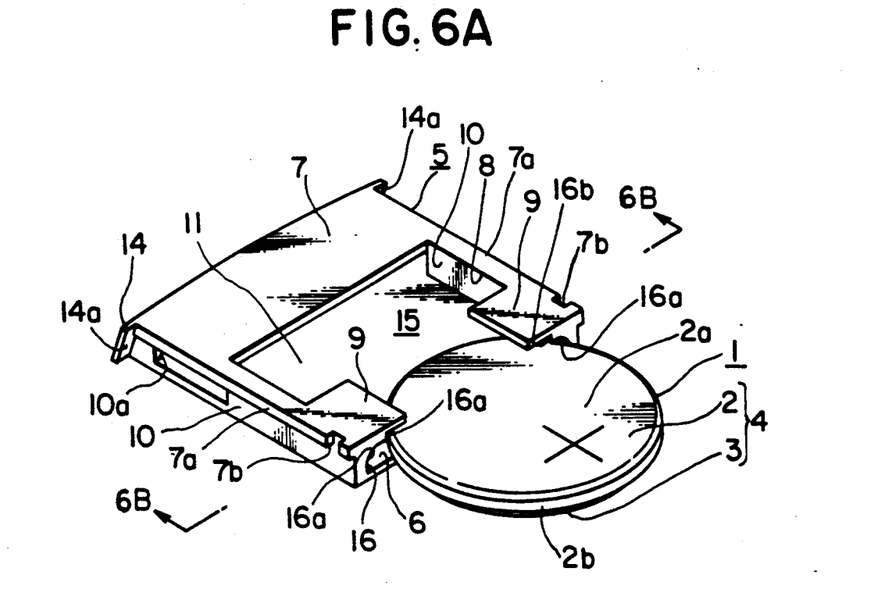
FIG. 6A is a perspective view of the holder under the condition where the button battery is incorrectly inserted from the insert opening of the holder.
Figure 6B:
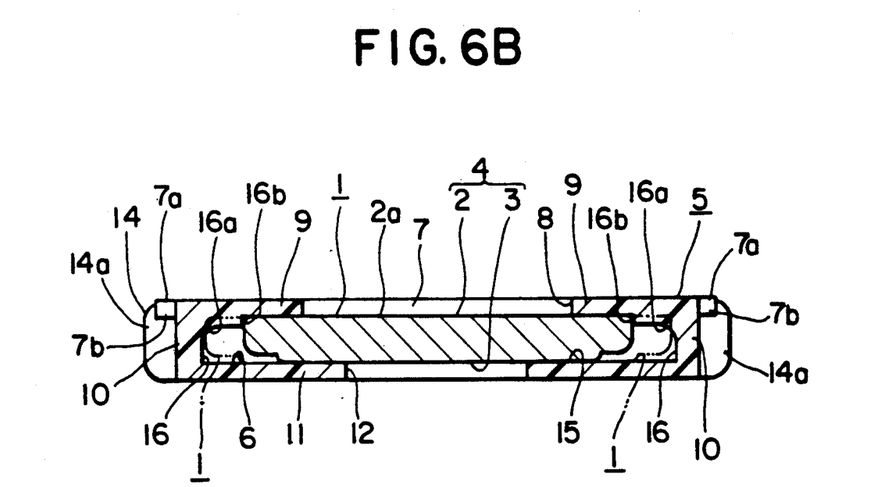
FIG. 6B is an enlarged cross section taken along the line B—B in FIG. 6A.

However, if the orientation of the button battery 1 is inverted, that is, if the positive electrode surface 2a is oriented to the upside, and the negative electrode surface 3a is oriented to the downside as shown in FIGS. 6A and 6B, the button battery 1 cannot be fully inserted into the accommodating portion 15. More specifically, upon inserting the button battery 1 from the insert opening 6, an outer diameter portion of the positive electrode shell 2 which portion is the outer diameter portion of the button battery 1 is inhibited from being inserted through a narrowest width between the stepped portions 16b and 16b' of the insert opening 6. Therefore, the button battery 1 as a whole cannot be inserted through the insert opening 6. In other words, it is possible to prevent the button battery 1 from being inserted through the insert opening 6 into the accommodating portion 15 under the incorrectly oriented condition of the button battery 1. Further, even if the holding portions 9 and 9' are upwardly flexed upon inserting the button battery 1 under the incorrectly oriented condition, the outer diameter portion of the positive electrode shell 2 is caught by a narrow portion between the curved portions 16a and 16a', thereby inhibiting further insertion of the button battery 1.

When the button battery 1 is inserted from the insert opening 6 into the accommodating portion 15 under the correctly oriented condition, and is held by the holder 5, the positive electrode surface 2a is partially exposed from the recess 12 of the bottom plate 11 to the outside of the holder 5, and the negative electrode surface 3a is partially exposed from the opening 8 of the top plate 7 to the outside of the holder 5.

Mounting of the Holder into Electronic Equipment

Figure 3:
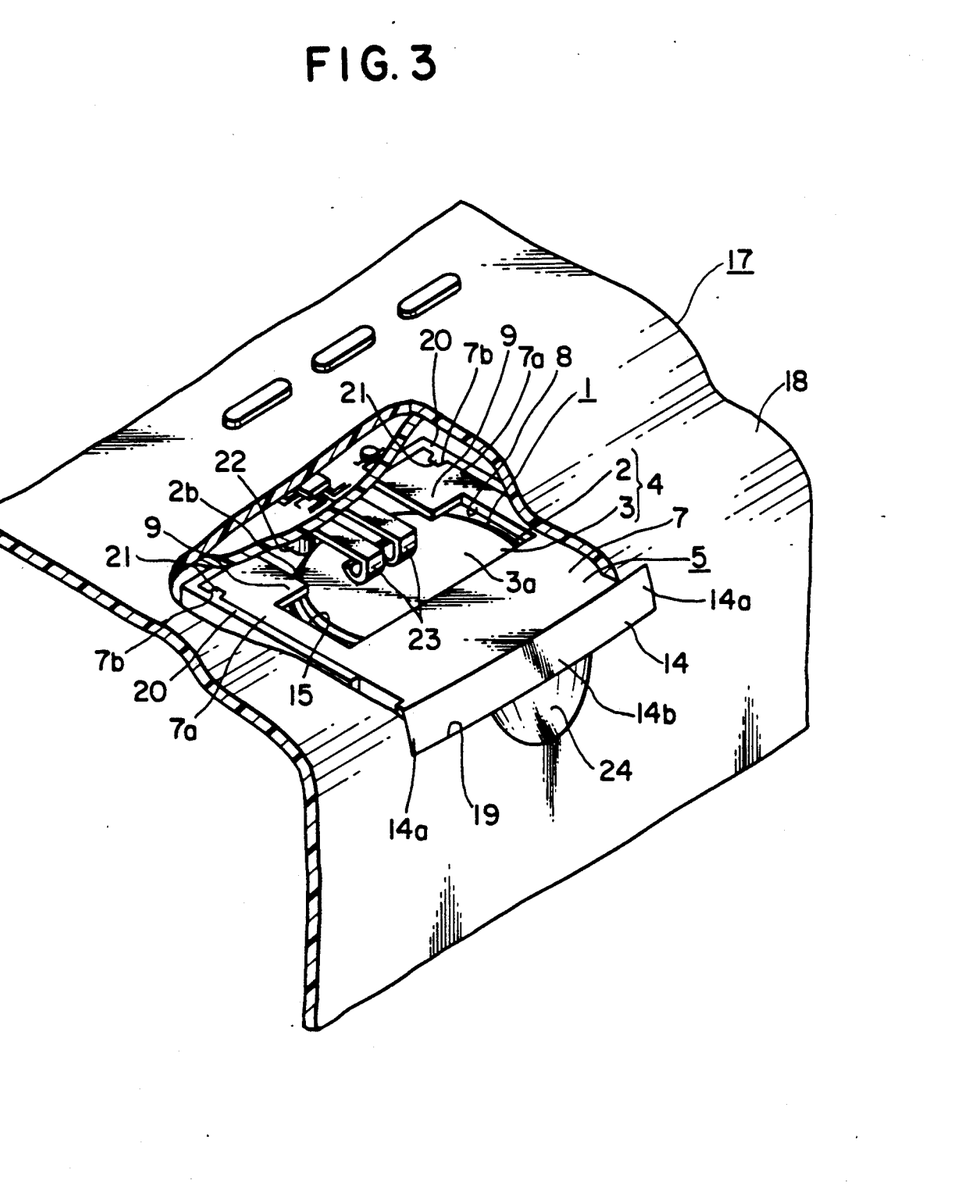
FIG. 3 is a view similar to FIG. 1, showing the condition where the holder is mounted in the electronic equipment.

Referring to FIGS. 1, 3 and 4, a housing 18 of the electronic equipment 17 is formed with a holder insert hole 19 for receiving the holder 5 in the planar direction thereof.

In the holder insert hole 19, a pair of right and left receiving walls 20 and 20' formed of synthetic resin having a flexibility are arranged in parallel relationship to each other, for supporting the side walls 10 and 10' and the side edges 7a and 7a' of the holder 5 when the holder 5 is inserted into the holder insert hole 19. The right and left receiving walls 20 and 20' are formed on its inside surfaces with a pair of right and left projections 21 and 21' adapted to engage the recesses 7b and 7b' of the side edges 7a and 7a' of the holder 5, respectively.

When the holder 5 is inserted into the holder insert hole 19 of the housing 18 of the electronic equipment 17 with the button battery insert opening 6 directed to the hole 19, the holder 5 is guided by the right and left receiving walls 20 and 20', and the front ends of the side edges 7a and 7a' of the top plate 7 of the holder 5 reaches the right and left projections 21 and 21' of the receiving walls 20 and 20'. Then, when the holder 5 is further inserted, the receiving walls 20 and 20' are flexed outwardly while the front ends of the side edges 7a and 7a' forcibly urge the projections 21 and 21' outwardly. After the front ends of the side edges 7a and 7a' get over the projections 21 and 21', the recesses 7b and 7b' of the side edges 7a and 7a' are brought into engagement with the projections 21 and 21', respectively.

Thus, disengagement of the holder 5 from the electronic equipment 17 is prevented.

Under such a mounted condition of the holder 5 as mentioned above, a positive terminal 22 provided in the electronic equipment 17 is maintained in electric contact with an outer surface of the side walls portion 2b of the positive electrode shell 2 through the recess 12 of the bottom plate 11 of the holder 5, and two negative terminals 23 provided in the electronic equipment 17 are maintained in electric contact with the negative electrode surface 3a through the opening 8 of the top plate 7 of the holder 5.

As shown in FIG. 4, a curved recess 24 is formed on an outer side surface of the housing 18 of the electronic equipment 17 at a position such that when the holder 5 is fully inserted into the holder insert hole 19, the segmental recess 13 of the holder 5 comes into alignment to the curved recess 24. In the case of removing the holder 5 from the electronic equipment 17, the holder 5 is drawn out of the holder insert hole 19 by hooking an edge of the segmental recess 13 with a finger nail and applying a small drawing force. That is, when the small drawing force is applied to the holder 5, the receiving walls 20 and 20' formed in the holder insert hole 19 are flexed outwardly to bring the recesses 7b and 7b' into disengagement from the projections 21 and 21'. Thus, the holder 5 can be readily removed from the electronic equipment 17.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A holder for holding a button battery, said holder being adapted to be mounted into an electronic equipment in a direction parallel to opposite electrode surfaces of said button battery, said holder comprising:

a top plate having an opening;

a bottom plate;

a pair of side walls connecting said top plate with said bottom plate at their opposite side portions;

a closed rear end wall connecting said top plate and said bottom plate with said side walls at their rear end portions, said pair of side walls being formed by an inner surface having a pair of right and left curved portions with a shape corresponding to a sectional shape of a side wall portion of a positive electrode shell of said button battery and a pair of right and left stepped portions having a shape corresponding to a sectional shape of a projecting portion of a negative electrode shell of said button battery, said projecting portion projecting upwardly from said side wall portion of said positive electrode shell;

an open front end portion forming a button battery insert opening for introducing said button battery in the direction parallel to the electrode surfaces of said button battery; and a button battery accommodating portion surrounded by said top plate, said bottom plate and said side walls so as to be continued from said open front end portion, for accommodating said button battery inserted from said button battery insert opening.

2. The holder as defined in claim 1, wherein opposite side portions of said button battery insert opening having a shape corresponding to a sectional shape of a side peripheral portion of said button battery.

3. The holder as defined in claim 1, wherein said opening of said top plate comprises a large-width opening portion and a small-width opening portion continuing from said large-width opening portion to an upper portion of said button battery insert opening.

* * * * *

UNITED STATES PATENT AND TRADEMARK OFFICE
CERTIFICATE OF CORRECTION

PATENT NO. : 5,188,912

DATED : February 23, 1993

INVENTOR(S) : Tomoyuki Katoh and Nobuhito Ebine

It is certified that error appears in the above-identified patent and that said Letters Patent is hereby corrected as shown below:

On the title page: Item [75] correct the first name of the inventor to read -- Tomoyuki --.

Signed and Sealed this

Seventh Day of December, 1993

Attest:

BRUCE LEHMAN

Attesting Officer

Commissioner of Patents and Trademarks